US007202413B2

(12) United States Patent
Jacobazzi et al.

(10) Patent No.: US 7,202,413 B2
(45) Date of Patent: Apr. 10, 2007

(54) RUBBER INSULATING BLANKET AND METHOD USING SAME

(75) Inventors: Ralph Jacobazzi, Des Plaines, IL (US); Alfred R. Flojo, Chicago, IL (US)

(73) Assignee: Norcross Safety Products, L.L.C., Skokie, IL (US)

( * ) Notice: Subject to any disclaimer, the term of this patent is extended or adjusted under 35 U.S.C. 154(b) by 0 days.

(21) Appl. No.: 10/929,741

(22) Filed: Aug. 30, 2004

(65) Prior Publication Data

US 2006/0042812 A1 Mar. 2, 2006

(51) Int. Cl.
*H02G 7/00* (2006.01)

(52) U.S. Cl. ........................ 174/5 R; 174/5 SB; 174/46

(58) Field of Classification Search ................ 174/5 R, 174/5 SB, 5 SG, 46
See application file for complete search history.

(56) References Cited

U.S. PATENT DOCUMENTS 1,403,034 A 1/1922 Kingsbury
2,576,238 A 11/1951 Rayburn
3,135,820 A 6/1964 Hallett, Jr. et al.
3,149,390 A 9/1964 McCoy
3,595,140 A 7/1971 Lundin
4,901,706 A * 2/1990 Schwanke, Jr. ............. 126/500
4,940,620 A 7/1990 Silk et al.
5,377,577 A 1/1995 Bounkong et al.
5,743,636 A * 4/1998 Payne ........................... 366/1
6,177,165 B1 1/2001 Robbins, III et al.
6,183,833 B1 2/2001 Robbins, III et al.
2004/0081946 A1 4/2004 Hensley

FOREIGN PATENT DOCUMENTS

GB 2103084 A 2/1983

OTHER PUBLICATIONS

Salisbury, Online Catalog, pp. B-3 through B-4, accessed Aug. 5, 2004.

(Continued)

*Primary Examiner*—Jinhee Lee
(74) *Attorney, Agent, or Firm*—Wood, Phillips, Katz, Clark & Mortimer

(57) ABSTRACT

A rubber insulating blanket of a type used by workers, such as electrical lineworkers and industrial electricians, to cover live electrical conductors, apparatus, or circuits, so as to protect themselves against electrical shock hazards, is generally square or otherwise generally rectangular, so as to have two longitudinal edges and two transverse edges. The blanket is provided with four handles, each of which is located at the middle of a separate edge of the blanket. If the blanket has eyelets located near the middles of the longitudinal edges, the eyelets so located are located between the handles located at those same portions. Being unitary with the remainder of the blanket and having outer portions projecting outwardly from the edges where the handles are located, the handles do not interfere with rolling of the blanket, as for storage of the blanket in a canister. If equipped with the blanket, a worker can manipulate the blanket easily, via the handles, even while the worker is working on a pole, on a ladder, or in an elevated bucket. A group of such blankets, if stacked so that their handles have aligned openings, can be easily manipulated by a worker or workers.

9 Claims, 2 Drawing Sheets

OTHER PUBLICATIONS

ASTM D 1048-99 “Standard Specification for Rubber Insulating Blankets,” Sep. 1995, West Conshohocken, Pennsylvania.

Mitchell Instrument, 2002-2003, p. 95, insulating rubber blankets [retrieved on Dec. 14, 2004]. Retrieved from internet using Google Advanced Catalog search, <URL.www.mitchellinstruments.com>.

* cited by examiner

RUBBER INSULATING BLANKET AND METHOD USING SAME

TECHNICAL FIELD OF THE INVENTION

This invention pertains to a rubber insulating blanket of a type used by workers, such as electrical lineworkers and industrial electricians, to cover live electrical conductors, apparatus, or circuits, so as to protect themselves against electrical shock hazards.

BACKGROUND OF THE INVENTION

Commonly, rubber insulating blankets of the type noted above are made to conform to standard specifications, as exemplified by ASTM D 1048-99, which is entitled "Standard Specification for Rubber Insulating Blanket", which was published in September 1999 by ASTM of West Conshohocken, Pa., and the content of which is incorporated herein by reference. Herein, as in ASTM D 1048-99, the term "rubber" is "a generic term that includes elastomers and elastomer compounds regardless of origin."

Commonly, a rubber insulating blanket of the type noted above is generally square or otherwise generally rectangular, so as to have two longitudinal edges, two transverse edges, and four corners. Commonly, a rubber insulating blanket of the type noted above has multiple eyelets, which include an eyelet near each corner and an eyelet near the middle of each longitudinal edge. Commonly, a rubber insulating blanket of the type noted above has a generally uniform thickness, except for a "beaded edge" defined in ASTM D 1048-99 as "a narrow border of thicker rubber which extends completely around the outer edges of the blanket."

Various models of rubber insulating blankets of the type noted above have been available commercially heretofore from Salisbury, which is located in Skokie, Ill., and from other sources. Canisters to store such blankets, after such blankets have been rolled, also have been commercially available from Salisbury.

SUMMARY OF THE INVENTION

Broadly, this invention provides a rubber insulating blanket of a type used by workers, such as electrical lineworkers and industrial electricians, to cover live electrical conductors, apparatus, or circuits, so as to protect themselves against electrical shock hazards, wherein the blanket has a handle, which preferably is located at an edge of the blanket. Preferably, the blanket has plural edges and plural handles, each of which is located at a separate one of the edges of the blanket.

Preferably, moreover, the blanket is generally square or otherwise generally rectangular, so as to have two longitudinal edges and two transverse edges, and the blanket has four handles, each of which is located at a separate one of the edges of the blanket. Preferably, moreover, each handle is located at a middle portion of the edge where said handle is located.

This invention also provides a method for equipping a worker, such as an electrical lineworker or an industrial electrician. The method comprises providing the worker with the rubber insulating blanket, as described above. If equipped with such a blanket, a worker can manipulate the blanket easily, via the handle or handles, even while the worker is working on a pole, on a ladder, or in an elevated bucket.

This invention also provides a stack of rubber insulating blankets, each according to the rubber insulating blanket described above, as stacked so that openings of the handles of the stacked blankets are aligned along at least one of the longitudinal and transverse edges of the stacked blankets, whereby a group of such blankets, so stacked, can be easily manipulated by a worker or workers.

DETAILED DESCRIPTION OF THE ILLUSTRATED EMBODIMENT

Figure 1:
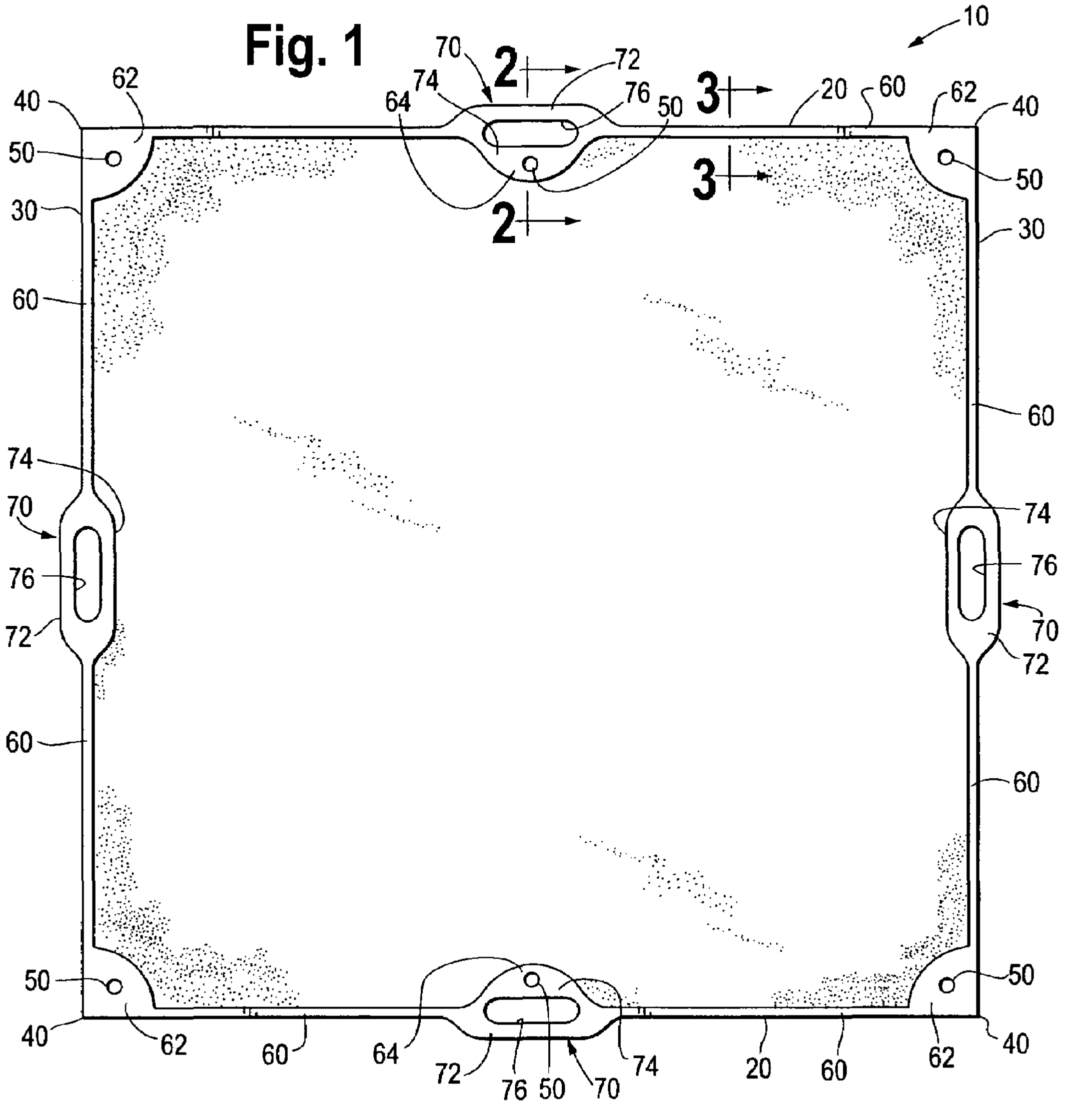
FIG. 1 is a top plan of a rubber insulating blanket embodying this invention.

As illustrated, a rubber insulating blanket 10 embodying this invention is generally square, so as to have two longitudinal edges 20 about two to four feet long, two transverse edges 30 about two to four feet long, and four corners 40. Except as illustrated and described herein, the blanket 10 is similar to rubber insulating blankets commercially available heretofore from Salisbury, supra, and conforming to ASTM D 1048-99, supra.

The blanket 10 has six eyelets 50, namely, one eyelet 50 near each corner 40 and one eyelet 50 near the middle of each longitudinal edge 20. The eyelets 50 near the corners 40 meeting each longitudinal edge 20 and the eyelet 50 near the middle of said longitudinal edge 20 are aligned longitudinally. The blanket 10 does not have any eyelets near the middles of the transverse edges 30. In a known manner, the eyelets 50 coact with securements, such as buttons or tie-straps, so as to secure the longitudinal edges 20 to each other after the blanket 10 has been wrapped around an elongate object, such as an electrical conductor. Each of the longitudinal and transverse edges 20, 30, is a beaded edge having a narrow border 60 of thicker rubber, as described above. The narrow border 60 is widened at each corner 40, so as to defined a pad 62 reinforcing the blanket 10 where the eyelet 50 near said corner 40 is provided. The narrow border 60 is widened at the middle of each longitudinal edge 20, so as to define a pad 64 reinforcing the blanket 10 where the eyelet 50 near said longitudinal edge 20 is located.

As contemplated by this invention, the blanket 10 has four handles 70, each of which spans the middle of a separate one of the longitudinal and transverse edges 20, 30, between two of the corners 40. Each handle 70 is unitary with the remainder of the blanket 10. Each handle 70 has an outer portion 72, which projects outwardly from the edge 20, 30, where said handle 70 is located, and an inner portion 74. Each handle 70 defines an elongate opening 76, which is adapted to admit one hand of an adult worker, between the outer and inner portions 72, 74, of said handle 70. If equipped with the blanket 10, a worker, such as an electrical lineworker, can manipulate the blanket 10 easily, via one of the handles 70 or via two of the handles 70, even while the worker is working on a pole, on a ladder, or in an elevated bucket.

The blanket 10 can be molded, as by injection molding or compression molding, from a suitable rubber, such as SALCOR™ rubber used by Salisbury, supra, for rubber insulative blankets and other insulative products, so as to have a generally uniform thickness, except that the narrow border 60, the pads 62, 64, and the handles 70 have equal thicknesses, which are greater than the generally uniform thickness. Along the longitudinal edges 20, the pads 64 and the inner portions 74 of the handles 70 coalesce.

Figure 4:
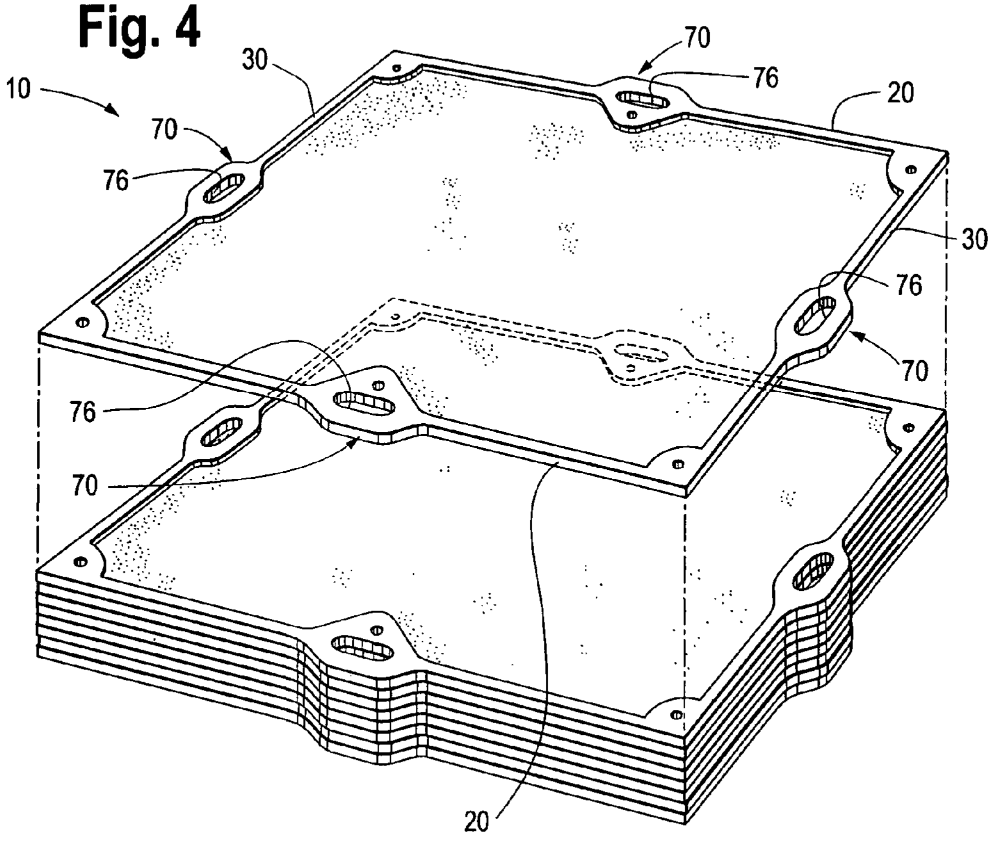
FIG. 4 is an isometric view of a stack of rubber insulating blankets, as illustrated in FIGS. 1, 2, and 3, and stacked so that openings of their handles are aligned in the stack.
Figure 5:
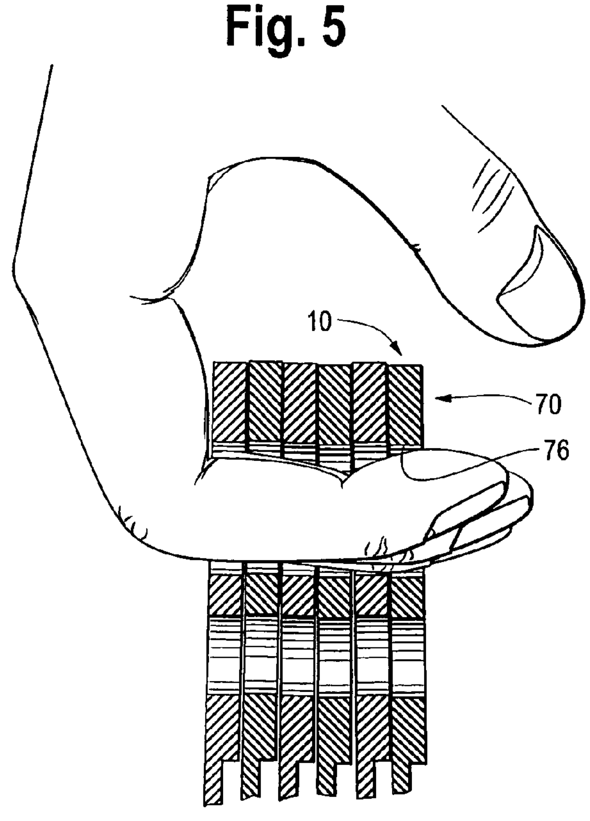
FIG. 5 is a fragmentary, pictorial view illustrating how a group of such blankets, so stacked, can be easily manipulated by a worker.

As illustrated in FIGS. 4 and 5, if multiple blankets 10 are stacked in a stack wherein, along at least one of the longitudinal and transverse edges 20, 30, of the stacked blankets 10, the elongate openings 76 of the handles 70 of the stacked blankets 70 are aligned, a worker or workers can manipulate a group of the stacked blankets 10 easily, via the handles 70 having the aligned openings 76 along at least one of the longitudinal and transverse edges 20, 30, of the blankets 10 in the stack. The group to be thus manipulated is comprised of some or all of the blankets 10 in the stack, whichever can be easily grasped by the handles 70 having the aligned openings 76.

Figure 2:
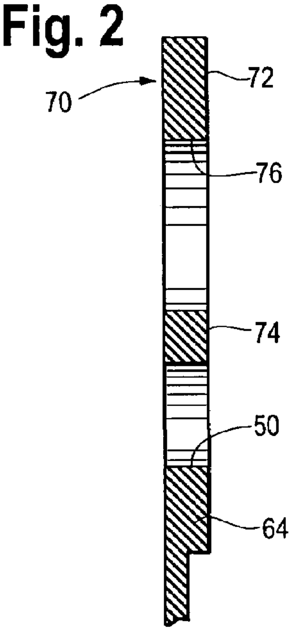
FIG. 2, on a larger scale, is a fragmentary, sectional view taken along line 2—2 of FIG. 1, in a direction indicated by arrows.
Figure 3:
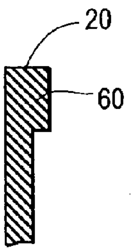
FIG. 3, on a similar scale, is a fragmentary, sectional view taken along line 3—3 of FIG. 1, in a direction indicated by arrows.

As illustrated in FIGS. 1, 2, and 3 and in other views, the blanket 10 and the handles 70 are made in one piece, so that the handles 70 are unitary with the remainder of the blanket 10. Being unitary with the remainder of the blanket 10 and having the outer portions 72 projecting outwardly from the edges 20,30, where the handles 70 are located, the handles 70 do not interfere with rolling of the blanket 10 about a longitudinal or horizontal axis, as for storage of the blanket 10 in a canister.

The invention claimed is:

1. A rubber insulating blanket of a type used by workers to cover live electrical conductors, apparatus, or circuits, so as to protect themselves against electrical shock hazards, comprising a rubber insulating blanket having four edges meeting at four corners, the blanket having a first thickness of rubber, the edges having a narrow border having a second thickness of rubber greater than the first thickness, and a unitary handle at one of said edges within the narrow border, in spaced relation to two of said corners spanning a middle portion of the edge, wherein the handle has an outer portion projecting outwardly from the edge where the handle is located.

2. The rubber insulating blanket of claim 1, wherein the unitary handle is one of plural unitary handles, each at one of said edges, each in spaced relation to two of said corners.

3. The rubber insulating blanket of claim 1, wherein the unitary handle is one of four unitary handles, each at one of said edges, each in spaced relation to two of said corners.

4. A method of protecting a worker against electrical shock hazards from electrical conductors, apparatus, or circuits, wherein the method comprises providing the worker with a rubber insulating blanket of a type used by workers to cover live electrical conductors, apparatus, or circuits, so as to protect themselves against electrical shock hazards, comprising a rubber insulating blanket having four edges meeting at four corners, the blanket having a first thickness of rubber, the edges having a narrow border having a second thickness of rubber greater than the first thickness, and a unitary handle at one of said edges within the narrow border, in spaced relation to two of said corners spanning a middle portion of the edge, wherein the handle has an outer portion projecting outwardly from the edge where the handle is located.

5. The method of claim 4, wherein the unitary handle is one of plural unitary handles, each at one of said edges, each in spaced relation to two of said corners.

6. The method of claim 4, wherein the unitary handle is one of four unitary handles, each at one of said edges, each in spaced relation to two of said corners.

7. A method of protecting a worker working on a pole, on a ladder, or in an elevated bucket, against electrical shock hazards from electrical conductors, apparatus, or circuits, wherein the method comprises providing the worker with a rubber insulating blanket of a type used by workers to cover live electrical conductors, apparatus, or circuits, so as to protect themselves against electrical shock hazards, comprising a rubber insulating blanket having four edges meeting at four corners, the blanket having a first thickness of rubber, the edges having a narrow border having a second thickness of rubber greater than the first thickness, and a unitary handle at one of said edges within the narrow border, in spaced relation to two of said corners spanning a middle portion of the edge, wherein the handle has an outer portion projecting outwardly from the edge where the handle is located.

8. The method of claim 7, wherein the unitary handle is one of plural unitary handles, each at one of said edges, each in spaced relation to two of said corners.

9. The method of claim 7, wherein the unitary handle is one of four unitary handles, each at one of said edges, each in spaced relation to two of said corners.

* * * * *